United States Patent

[11] 3,601,561

[72] Inventor Richard L. Bennett
Saugus, Calif.
[21] Appl. No. 826,525
[22] Filed May 21, 1969
[45] Patented Aug. 24, 1971
[73] Assignee Perkins Research & Mfg. Co.
Canoga Park, Calif.

[54] APPARATUS FOR APPLYING AN IDENTIFYING SIGNAL TO A TELEPHONE-LINE PAIR WITHOUT DISTURBANCE OF SERVICE
9 Claims, 2 Drawing Figs.

[52] U.S. Cl. .......... 179/175.3
[51] Int. Cl. .......... H04m 3/26
[50] Field of Search .......... 179/175.3, 175.2, 175.1, 1 MN

[56] References Cited
UNITED STATES PATENTS

| | | | |
|---|---|---|---|
| 2,228,673 | 1/1941 | Reeves | 179/2 |
| 3,026,383 | 3/1962 | Englander | 179/1 |
| 3,084,230 | 4/1963 | Buhler | 179/175 |

*Primary Examiner*—Kathleen H. Claffy
*Assistant Examiner*—Douglas W. Olms
*Attorney*—Miketta, Glenny, poms & Smith

ABSTRACT: An apparatus for applying an identifying tone to a telephone-line pair without disturbing user service comprising a line tap, electrical signal-producing means for imposing a tone on the telephone pair, and a switch circuit connected between the tapping line and the tone-producing means and responsive to potential in the telephone pair so as to selectively connect the tone-producing means to the pair when the lines are not in use as indicated by the telephone-pair potential and capacity.

PATENTED AUG 24 1971 3,601,561

INVENTOR.
RICHARD L. BENNETT
By
Miketta, Glenny, Poms & Smith
ATTORNEYS.

APPARATUS FOR APPLYING AN IDENTIFYING SIGNAL TO A TELEPHONE-LINE PAIR WITHOUT DISTURBANCE OF SERVICE

BACKGROUND OF THE INVENTION

This invention generally relates to telephone line-testing devices used for identification of a particular telephone pair. In the prior art, the problem of identification of a specific pair of telephone wires constituting a talking circuit was initially solved by providing the telephone craftsman with a headset enabling him to ascertain if the telephone pair was in use. Such solution was palpably unsatisfactory since it (1) encouraged the telephone craftsman to listen in if a conversation was taking place on the circuit, (2) was not easily performed and therefore, was sometimes not undertaken, and (3) when there was a lull in such conversation, the telephone craftsman was led to believe that the line was not in use at which time he would impose an identification tone onto the circuit which was audible and annoying to the user resulting in complaints.

Accordingly, as described in detail in U.S. Pat. No. 2,084,230, a system was devised wherein the talking circuit could be tapped and a determination of whether the circuit was in use by the telephone craftsman was permitted solely through visual identification means. In the event that the telephone craftsman observed that the telephone line was not in use, a tone-producing device could be manually connected or switched on so as to impose the audible tone on the telephone pair.

However, such system, while satisfactory, may be improved, and it is accordingly an object of the present invention to provide a system or device for automatically testing a telephone pair in the field without disturbing user service and without requiring the constant or periodic visual attention of the telephone craftsman. It is also an object of this invention to provide a portable automatic telephone line-testing unit which provides an audible tone through a tapping line to the telephone pair, for identification of such pair, and which will rapidly, automatically, and immediately disconnect such tone-producing device from the telephone pair when such pair is put into service by the user. One more object of the present invention is to provide a testing unit of the last-described type which reduces the monitoring required by the telephone craftsman, which is easily manufactured and inexpensive, and which does not depend upon the telephone craftsman to assure that the user will not be disturbed by the presence of an audible tone inadvertently connected to the telephone pair when in use. Of course, other objects and advantages of the invention will be more apparent to those skilled in the art to which the invention pertains, from the hereinafter detailed description in connection with the appended drawing.

SUMMARY OF THE INVENTION

An apparatus for applying an identifying tone to telephone-line pair without disturbing user service comprising a tapping line, electrical signal-producing means for imposing a tone on the telephone lines, and switch-circuit means connected between the tapping line and tone-producing means responsive to potential in the telephone lines so as to selectively connect and disconnect the tone-producing means from the telephone lines through the tapping line when the telephone lines are not in service as indicated by the potential and capacity thereof.

DETAILED DESCRIPTION OF THE PREFERRED EMBODIMENT

To facilitate the explanation of the exemplary embodiment of the apparatus for applying an identifying tone to telephone lines of the present invention, attention is first directed to the normal operation of a telephone-pair talking circuit and the possible status of such telephone lines in relation to user service. As is well known in the art, the service status of the telephone pair is indicated by the voltage potential and capacity between such pair and ground at any given time. For example, when the telephone pair is not attached to a hand instrument and associated telephone equipment providing a source of potential, that is, the circuit is "dead," there is generally no potential in such pair, and in any event, the potential is less than 5 volts. When a hand instrument is attached to such pair, and is in service by the user, the potential of the pair will vary between 5 and 46 volts depending upon the location at which the potential is measured which is unimportant for purposes of the present invention. Third, when a hand instrument is attached to such telephone pair, but such instrument is not in use, the potential in such pair will vary between 48 and 52 volts, generally. Finally, when the user hand instrument to which the telephone pair is connected is ringing, that is, the user is being called by another user, a condition generally known as "generator" to those skilled in the art, the potential of the telephone pair will be approximately 90 volts.

The term "alive" is used herein to indicate the service status of the telephone pair when such pair is connected to a hand instrument or telephone, and associated telephone equipment providing a source of potential. The term "dead" is used to identify the service status when the pair is not attached to a telephone or handset and associated telephone equipment providing a source of potential. The term "generator" is used to identify the service status of the telephone pair when such pair is connected to a hand instrument or telephone and associated telephone equipment providing a source of potential and a ringing signal is applied to the pair.

It will be understood that for purposes of the present invention, the specific potential or potential range for each status of service is not critical but rather it is important that some predeterminable telephone-pair potential or potential range be known for each status of service. While differences in the potential or potential ranges will affect the values of the circuit components of the switch-circuit means, and may affect the choice of components itself, it will be appreciated that the present invention is broadly directed to the automatic controlling or connecting and disconnecting of an identification tone-producing device to a telephone pair in relation to the status of service of such pair so as to prevent such audible tone from disturbing, annoying and irritating the user.

Figure 1:
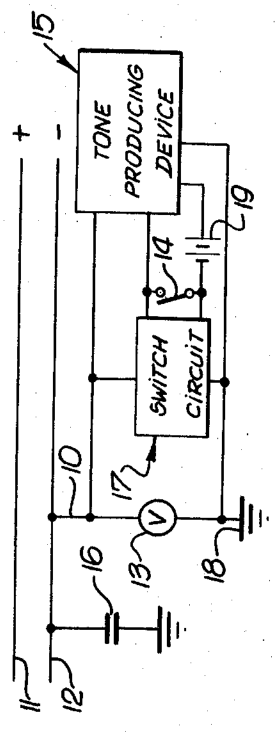
FIG. 1 is a diagrammatic view of an exemplary embodiment of an apparatus for applying an identifying tone to a telephone-line pair without disturbing user service, constructed in accordance with the present invention.

With the preceding description of the normal status of a telephone pair in mind, reference is now made to FIG. 1 diagrammatically disclosing an apparatus for applying an identifying tone to a telephone-line pair constructed in accordance with the present invention. The telephone-line pair of wires are indicated by reference numerals 11, 12, and negative wire 12 having a tapping line 10 connected thereto and to a voltmeter 13 for providing a visual indication to a lineman of the potential in the telephone pair 11, 12. The voltmeter provides a visual indication of the status of the line so that, as required in certain operations, the lineman may use the manual override switch 14 so as to control operation or connection of a tone-producing device 15. As is well known, the telephone pair 11, 12 includes capacitance to ground represented in FIG. 1 by capacitor 16. The function of such telephone-pair capacitance will be more fully described hereinafter.

The tapping line 10 is also connected to a switch circuit, indicated generally at 17, to tone-producing device 15 which imposes a tone on the telephone pair 11, 12 under the control of switch circuit 17 and/or the manual switch 14. The voltmeter 13, switch circuit 17 and tone-producing device 15 are grounded at 18. The tone-producing device or electrical-signal-producing means may comprise a conventional oscillator capable of producing a tone having a frequency of 500 cycles with a 4–6-cycle warble, such tone having been found useful in testing telephone lines. Such tone-producing device 15 includes its own battery 19 and requires no outside source of current permitting the testing device of this invention to be portable. The details of the tone-producing device 15 are not material to the present invention and further description is believed unnecessary.

The switch-circuit means 17, responsive to the potential and capacity of the telephone wires 11, 12, automatically selectively connects the tone-producing device 15 to the telephone lines through the tapping line 10. Such means generally comprises circuit means for operating or connecting the tone-producing device when the telephone line potential indicates a lack of any associated telephone equipment providing a source of potential attached to such line, that is, the line is "dead." Switch circuit 17 also includes means for disconnecting the tone-producing device when the line potential indicates that the line is "alive" but is in use. Means is further provided for connecting the tone-producing device when the telephone lines are "alive" but not in use and finally circuit means for disconnecting the tone-producing device to the line when the telephone line is "alive" but not in use so that line potential so indicates such status but subsequent line potential indicates generator. The last-mentioned means also maintains the tone-producing device disconnected, in a preferred form of the invention, until the tapping line is removed so that the potential and capacity at such means is zero.

Figure 2:
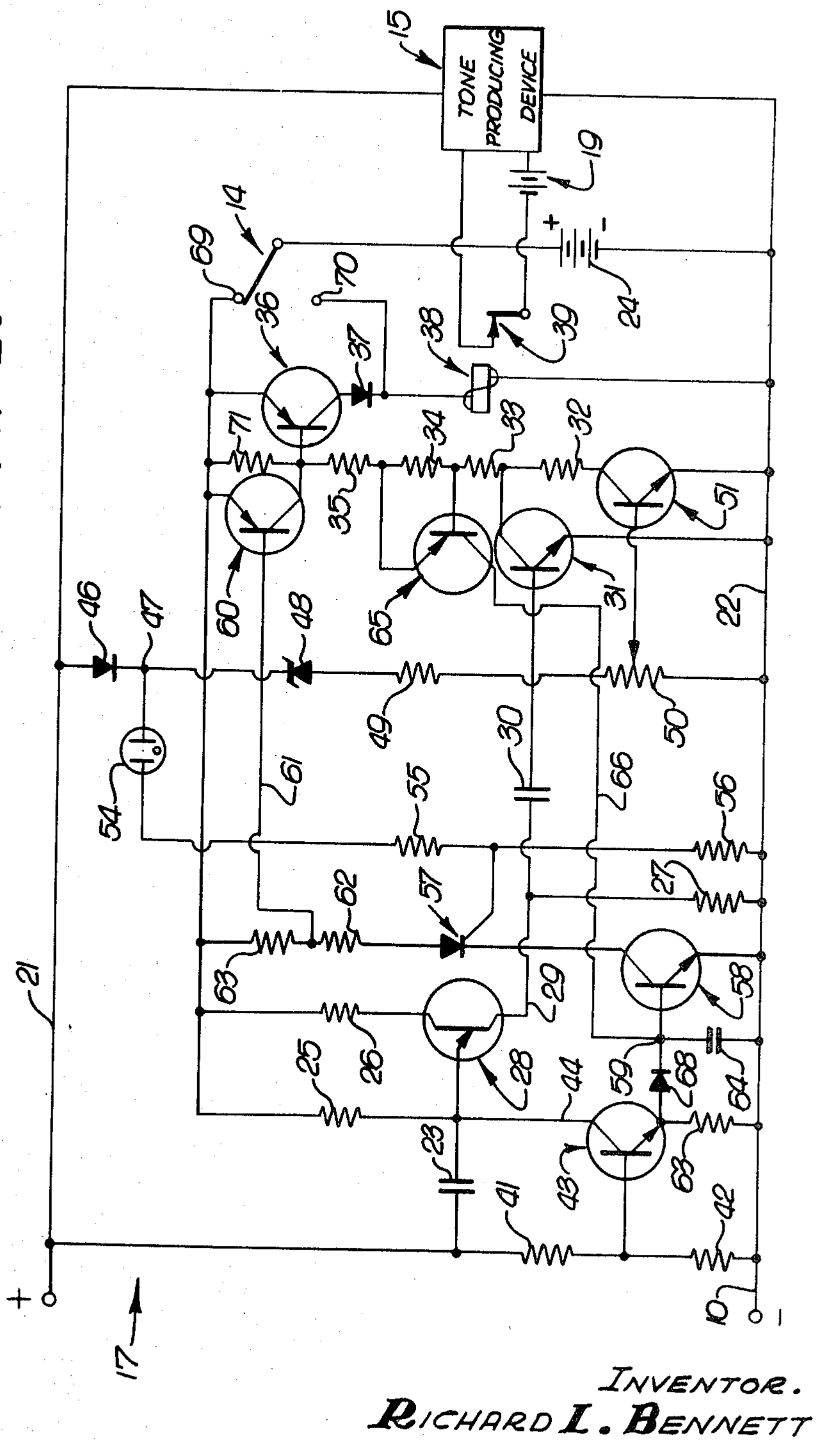
FIG. 2 is a diagrammatic view of an exemplary embodiment of a switch circuit employed in the apparatus.

An exemplary embodiment of switch-circuit means 17, comprising the above-identified means for specifically connecting and disconnecting the tone-producing device, is diagrammatically shown in FIG. 2, to which attention is now directed. The circuit 17 includes a ground line 21 connected to ground 18 and negative line 22 connected through tapline 10 to telephone wire 12. The means for operating the tone-producing device 15 when line potential indicates that the line is "dead" is a well-known unijunction-oscillator circuit using the telephone-pair capacity 16 in series with frequency-limiting capacitor 23. Such circuit also comprises the battery 24, resistors 25, 26, and 27, and unijunction transistor 28. The output conductor 29 of unijunction transistor 28 is connected through a capacitor 30 to the base of a transistor 31. Providing that the tapline 10 is connected so that the telephone-line capacity completes the unijunction-oscillator circuit, the unijunction transistor 28 will conduct so as to turn on transistor 31 which in turn through series resistors 32, 33, 34, and 35 provide current to the base of transistor 36 so as to turn such transistor on thus applying a current through blocking diode 37 to, and operating, relay 38 causing relay contacts 39 to close so as to connect battery 19 to the tone-producing device 15 thereby causing a tone to be produced. It will also be appreciated that when no potential source is attached to the telephone pair 11, 12, capacity is present in the circuit and the voltage in the pair is less than 5 volts, so that the tone will be produced.

Circuit 17 also includes means for disconnecting the tone-producing device when the line potential indicates that the line is "alive" and in use, i.e., the potential is between 5 and approximately 46 volts. Such means comprises the resistors 41, 42, connecting the base of transistor 43 between ground line 21 and negative line 22, such transistor being connected through line 44 to the base of unijunction transistor 28 so that when transistor 43 is turned on, that is, when the voltage between ground and negative line exceeds 5 volts, the unijunction transistor 28 is shut down, thereby shutting down transistors 31 and 36 preventing the relay 38 from operating so that relay switch 39 remains open so that the tone-producing device circuit remains open.

The means for operating the tone-producing device when the telephone pair is alive but not in use includes the diode 46 connected between ground line 21 and terminal 47. A zener diode 48 is connected to the terminal 47 and through a resistance 49 and a variable resistance 50 applies a voltage to transistor 51 turning on such transistor and consequently turning on transistor 36 and operating relay 38 so as to close relay switch 39 completing the tone-producing device circuit. The precise voltage at which the transistor 51 will conduct is determined by the variable resistor 50 through the voltage-dividing network 49, 50.

The switch circuit 17 also includes means disconnecting (until the line potential and capacity is zero) the tone-producing device 15 which is operating under the foregoing explained circumstances in which the line potential indicates that the line is "alive" but not in use and subsequently, the potential increases significantly because of generator, i.e., a potential of approximately 90 volts is impressed upon the circuit. Such means comprises the neon tube 54 which is connected through a voltage-dividing network including resistances 55, 56 to the gate of a SCR 57, the cathode lead to the SCR being connected to a transistor 58 which is in turn connected to line 22 and under control of those circuits terminating at junction 59. The output of the SCR is connected to the base of another transistor 60 which turns on through line 61 after proper voltage division through resistances 62, 63. Transistor 60 is connected to transistor 36 in such a manner as to keep transistor 36 from operating when transistor 60 is turned on and accordingly keeping relay switch 39 open.

When a user hangs up the handset, transitory potential variation occurs in the telephone pair which could inadvertently turn off transistor 58 which controls the SCR 57 and thereby transistors 60 and 36 and finally relay switch 39. To prevent such occurrence, a condenser 64 is connected between the base of transistor 58 at the junction 59 and to line 22 so as to cause an approximate 3-second delay in the release of transistor 58. Transistor 65 is connected to line 66 which is also connected at junction 59 so as to keep transistor 58 turned on if the unijunction oscillator is operating. Transistor 43, through blocking diode 68 also connected to junction 59, keeps transistor 58 turned on if more than a 5-volt potential appears between ground line 21 and negative line 22. Accordingly, the lineman must remove line tap 10 for approximately 3 seconds so that the potential and capacity is reduced to zero which permits the tone-producing device to be subsequently operative. The unit also includes means for manually controlling the tone-producing device 15 which comprises the battery 24 and manual switch 14. When switch 14 is in the automatic position, indicated at 69, battery 24 operates relay 38 through the switch circuit 17 previously described. When switch 14 is in manual position 70, battery 24 operates relay 38 directly thereby disconnecting and overriding the automatic switch circuit 17.

In operation, if the tapping line 10 is connected to one wire of the telephone pair, such as telephone wire 12, and the wire is "dead," telephone line capacity will be applied to unijunction transistor 28 which will in turn provide voltage to transistor 31 so as to turn on transistor 36 and through blocking diode 37 will operate relay 38 and relay switch 39 so as to operate the tone-producing device 15.

However, when the voltage in the telephone pair exceeds 5 volts, the transistor 43 will be turned on so as to short out the unijunction transistor 28 thereby shutting down transistor 31 and consequently transistor 36 and opening relay switch 39. Transistor 43 will be turned on so as to disconnect the tone-producing device 15 through the potential range of 5 to 46 volts.

Assuming that the voltage in the circuit is greater than 46 volts, and to provide a measure of safety, such voltage level may be 48 volts, the potential will be applied through the voltage-dividing network comprising the resistors 49, 50 to transistor 51, the output of which is connected through the series of resistors 32 through 35, to transistor 36 so as to turn on such transistor when transistor 51 is operating. Accordingly, the tone-producing device 15 will again produce a tone on the telephone pair since relay switch 39 will be closed.

Assume that the telephone handset of the user is not in use, such that the potential of the telephone-pair circuit is between 48 and 52 volts so that the tone-producing device 15 is operating. If at this point, the user should commence use of his handset, the voltage will fall to the range of 5 to 46 volts and the tone-producing device will be immediately disconnected. But assume that a call is initiated to the user of the handset to which the telephone wires 11, 12 are connected. In this circumstance, the circuit is placed in the condition commonly known as generator wherein 90 volts are impressed upon telephone wires 11, 12 so as to cause the handset bell to ring. This high voltage, will turn on neon tube 54 which through the voltage-dividing network will be applied to the gate of SCR 57. As is well known, once the threshold voltage of the SCR is reached, a subsequent drop from the high voltage to a lower voltage will not turn off the device but it will continue to conduct. The output of the SCR is provided to transistor 60 which will turn on such transistor and thus short out the resistance 71 turning off transistor 36 and relay 38 so as to open relay switch 39. The tone-producing device will therefore be disconnected not only during each periodic generator current but will remain turned off even after the ringing is discontinued when the user does not answer. This occurs because after the SCR is turned on any cathode-to-anode current flow such as that supplied by transistor 58 will be sufficient to keep the SCR locked on. The device can be rendered operative again only when the lineman disconnects the line tap 10 which will cause the potential and capacity across lines 21, 22 to drop to zero so that the transistor 58 will be turned off and the SCR will be unlocked.

It will be apparent to those skilled in the art that other switch-circuit means than that described above may be employed to accomplish the objects of the present invention. Many modifications and variations of the present invention are possible in light of the above teachings. It is therefore to be understood that within the scope of the appended claims, the invention may be practiced otherwise than as specifically described.

I claim:

1. An apparatus for applying an identifying tone to a telephone-line pair without disturbing user service comprising:
- means for tapping one wire of the pair;
- electrical signal-producing means for applying a tone on the pair; and
- switch-circuit means connected to said tapping and producing means responsive to a potential between said wire and ground so as to selectively connect said tone-producing means to said pair through said tapping means when said pair is not in use as indicated by the potential between said wire and ground, and responsive to the capacity between said wire and ground so as to connect said tone-producing means when no potential is present.

2. The portable unit of claim 1 wherein said switch-circuit means comprises:
- means for connecting said tone-producing means when the telephone pair is dead;
- means for disconnecting said tone-producing means when the telephone pair are alive and in use;
- means for connecting the tone-producing means when the telephone pair are alive but not in use; and
- means for disconnecting the tone-producing means when the pair is alive and the pair potential indicates the connection of a ringing generator.

3. The portable unit of claim 2 wherein said last-named means maintains said tone-producing means disconnected until said tapping means is disconnected from said pair.

4. The portable unit of claim 3 wherein said means for connecting said tone-producing means when the telephone pair are dead comprises a unijunction oscillator circuit.

5. The portable unit of claim 3 additionally including visual means for identifying said telephone-pair potential.

6. The portable unit of claim 5 additionally including a manual override switch for disconnecting said switch-circuit means.

7. The portable unit of claim 6 additionally including battery means.

8. The portable unit of claim 5 wherein said visual means for identifying said telephone-line potential comprises a voltmeter.

9. An apparatus for applying an identifying tone to a telephone-line pair without disturbing user service comprising:
- means for tapping one of the pair;
- electrical signal-producing means for imposing a tone on the pair; and
- switch-circuit means connected to said tapping and tone-producing means responsive to potential and capacity in said pair including:
  - means for connecting said tone-producing means when the telephone-pair potential is in the range of 0 to 5 volts,
  - means for disconnecting said tone-producing means when the telephone-pair potential is in the range of 5 to substantially 46 volts,
  - means for connecting the tone-producing means when the telephone-pair potential is in the range of 48 to 90 volts, and
  - means for disconnecting the tone-producing means when the telephone-pair potential is above 90 volts, whereby said switch-circuit means selectively connects said tone-producing means to said telephone pair through said tapping means when said pair is not in use as indicated by the pair potential.